(12) United States Patent
Shahar et al.

(10) Patent No.: US 7,567,757 B2
(45) Date of Patent: Jul. 28, 2009

(54) GENERATING OF HIGH RATE MODULATED PULSE STREAMS

(75) Inventors: Arie Shahar, Rye Brook, NY (US); Eldan Halberthal, Rye Brook, NY (US)

(73) Assignee: Main Street Ventures LLC, White Plains, NY (US)

( * ) Notice: Subject to any disclaimer, the term of this patent is extended or adjusted under 35 U.S.C. 154(b) by 0 days.

(21) Appl. No.: 12/017,363

(22) Filed: Jan. 22, 2008

(65) Prior Publication Data
US 2008/0118249 A1    May 22, 2008

Related U.S. Application Data

(60) Division of application No. 10/845,238, filed on May 14, 2004, now Pat. No. 7,362,976, and a continuation-in-part of application No. 10/640,035, filed on Aug. 14, 2003, now Pat. No. 7,212,705, and a continuation-in-part of application No. 10/640,018, filed on Aug. 14, 2003, now Pat. No. 7,130,539, and a continuation-in-part of application No. 10/640,017, filed on Aug. 14, 2003, now Pat. No. 7,218,862, and a continuation-in-part of application No. 10/640,040, filed on Aug. 14, 2003, now Pat. No. 6,956,998, said application No. 10/845,238 is a continuation-in-part of application No. 10/404,140, filed on Apr. 2, 2003, now Pat. No. 6,795,626, and a continuation-in-part of application No. 10/404,077, filed on Apr. 2, 2003, now Pat. No. 6,892,016, and a continuation-in-part of application No. 10/472,244, filed as application No. PCT/US02/09969 on Mar. 28, 2002, now Pat. No. 7,215,844, said application No. 10/845,238 is a continuation-in-part of application No. 10/826,363, filed on Apr. 19, 2004, now Pat. No. 7,136,557, said application No. 10/845,238 is a continuation-in-part of application No. 10/827,314, filed on Apr. 20, 2004, now Pat. No. 7,203,396, said application No. 10/845,238 is a continuation-in-part of application No. 10/834,343, filed on Apr. 29, 2004, now Pat. No. 7,403,714.

(60) Provisional application No. 60/472,776, filed on May 23, 2003, provisional application No. 60/405,697, filed on Aug. 22, 2002, provisional application No. 60/464,351, filed on Apr. 22, 2003, provisional application No. 60/465,237, filed on Apr. 25, 2003, provisional application No. 60/467,563, filed on May 5, 2003.

(51) Int. Cl.
*H04J 14/08* (2006.01)
(52) U.S. Cl. .................. 398/102; 398/146; 398/189
(58) Field of Classification Search .................. 398/53, 398/80, 98, 101, 102, 146, 161, 179, 189, 398/190, 191
See application file for complete search history.

(56) References Cited

U.S. PATENT DOCUMENTS 4,652,079 A    3/1987    Shaw et al.

(Continued)

*Primary Examiner*—Christina Y Leung
(74) *Attorney, Agent, or Firm*—Shiloh Peleg & Co. Leason Ellis LLP

(57) ABSTRACT

All-optical system for generating high rate modulated signals. The system includes: a signal generator for generating a first periodic signal at a first rate; an optical chopping device arranged to receive the first periodic signal and to produce therefrom a second periodic signal having pulses that are narrower than the pulses of the first periodic signal; a splitting device for receiving and splitting the second periodic signal into multiple images of the second periodic signal to propagate along multiple optical paths, the multiple optical paths including optical modulators for modulating the images of the second periodic signal to produce modulated signals; and an interleaving device for receiving and interleaving the modulated signals to produce a stream of modulated signal having a second rate which is higher than the first rate.

11 Claims, 5 Drawing Sheets

U.S. PATENT DOCUMENTS

| | | |
|---|---|---|
| 5,896,212 A | 4/1999 | Sotom et al. |
| 6,108,474 A * | 8/2000 | Eggleton et al. ............ 385/122 |
| 6,204,956 B1 * | 3/2001 | Cisternino et al. .......... 359/328 |
| 7,027,735 B2 | 4/2006 | Kumar |
| 2002/0003641 A1 | 1/2002 | Hall et al. |

* cited by examiner

GENERATING OF HIGH RATE MODULATED PULSE STREAMS

CROSS-REFERENCE TO RELATED APPLICATIONS

This application is a divisional of and claims priority from U.S. patent application Ser. No. 10/845,238, filed on May 14, 2004 now U.S. Pat. No. 7,362,976 and titled "Generating of High Rate Modulated Pulse Streams", which in turn claims the benefit of U.S. Provisional Patent Application Ser. No. 60/472,776, filed on May 23, 2003 and titled "Generating of High Rate Modulated Pulse Streams". The entire disclosure of these applications is incorporated herein by reference.

In addition, application Ser. No. 10/845,238 is a Continuation-In-Part of U.S. patent application Ser. Nos. 10/640,035, 10/640,018, 10/640,017, and 10/640,040, all filed on Aug. 14, 2003 and all of which claim the benefit of U.S. Provisional Patent Application Ser. No. 60/405,697, filed on Aug. 22, 2002 and titled "Streaming Signal Control System for Digital Communication". These applications have since issued as U.S. Pat. No. 7,212,705 titled "All Optical Decoding Systems For Decoding Optical Encoded Data Symbols Across Multiple Decoding Layers", U.S. Pat. No. 7,130,539 titled "All Optical Decoding Systems For Optical Encoded Data Symbols", U.S. Pat. No. 7,218,862 titled "All Optical Cross Routing Using Decoding Systems For Optical Encoded Data Symbols", and U.S. Pat. No. 6,956,998 titled "Compact Optical Delay Lines", respectively. The entire disclosure of these applications is incorporated herein by reference.

In addition, application Ser. No. 10/845,238 is a Continuation-In-Part of U.S. patent application Ser. No. 10/404,140, filed on Apr. 2, 2003 and titled "Optical Threshold Devices and Method", now issued as U.S. Pat. No. 6,795,626. The entire disclosure of this application is incorporated herein by reference.

In addition, application Ser. No. 10/845,238 is a Continuation-In-Part of U.S. patent application Ser. No. 10/404,077, filed on Apr. 2, 2003 and titled "Optical Threshold Devices and Method", now issued as U.S. Pat. No. 6,892,016. The entire disclosure of this application is incorporated herein by reference.

In addition, application Ser. No. 10/845,238 is a Continuation-In-Part of U.S. patent application Ser. No. 10/472,244 (now issued as U.S. Pat. No. 7,215,844), filed on Sep. 22, 2003 and titled "Optical Pulse Chopper", which is a National Phase application of PCT Application Ser. No. PCT/US02/09969 (published as WO02079838), filed on Mar. 28, 2002 and titled "Optical Pulse Chopper". The entire disclosure of these applications is incorporated herein by reference.

In addition, application Ser. No. 10/845,238 is a Continuation-In-Part of U.S. patent application Ser. No. 10/826,363 (now issued as U.S. Pat. No. 7,136,557), filed on Apr. 19, 2004 and titled "All Optical Chopping For Shaping and Reshaping Apparatus And Method", which claims the benefit of U.S. Provisional Patent Application Ser. No. 60/464,351, filed on Apr. 22, 2003 and titled "All Optical Chopping For Shaping and Reshaping Apparatus And Method". The entire disclosure of these applications is incorporated herein by reference.

In addition, application Ser. No. 10/845,238 is a Continuation-In-Part of U.S. patent application Ser. No. 10/827,314 (now issued as U.S. Pat. No. 7,203,396), filed on Apr. 20, 2004 and titled "All Optical Chopping Using Logic Gates Apparatus And Method", which claims the benefit of U.S. Provisional Patent Application Ser. No. 60/465,237, filed on Apr. 25, 2003 and titled "All Optical Chopping Using Logic Gates Apparatus And Method". The entire disclosure of these applications is incorporated herein by reference.

In addition, application Ser. No. 10/845,238 is a Continuation-In-Part of U.S. patent application Ser. No. 10/834,343, filed on Apr. 29, 2004 now U.S. Pat. No. 7,403,714 and titled "All Optical Chromatic and Polarization Mode Dispersion Correctors", which claims the benefit of U.S. Provisional Patent Application Ser. No. 60/467,563, filed May 5, 2003, entitled "All Optical Chromatic and Polarization Mode Dispersion Correctors". The entire disclosure of these applications is incorporated herein by reference.

FIELD OF THE INVENTION

The invention relates to optical communication devices and systems and, more particularly, to optical systems and devices for generating high-rate modulated pulse streams of narrow pulses.

BACKGROUND OF THE INVENTION

In the field of optical communication, there is an increasing demand to transmit information at higher rates. Increasing the transmission rate requires the generation of narrower pulses arranged at higher density. To generate very narrow pulses, there is a need for very fast modulators. For the desired bit rates of some applications, there are no modulators available that are capable of producing the desired modulation rate. A lower bit rates, some modulators may be available; however, such modulators are complex and expensive.

SUMMARY OF THE INVENTION

Accordingly, it is an object of some exemplary embodiments of the present invention to provide high rate modulated streams of pulses.

Another object of some exemplary embodiments of the present invention is to provide high rate modulated streams of pulses generated by modulators that operate at a rate that is lower than the rate of the pulses in the stream that they produce.

Another object of some exemplary embodiments of the present invention is to provide high rate modulated streams of narrow pulses generated by modulators having a time window wider than the width of pulses they produce.

Another object of some exemplary embodiments of the present invention is to provide high rate modulated streams of pulses using mode locked lasers.

Another object of some exemplary embodiments of the present invention is to provide a system that is capable of interleaving several parallel information channels into a serial channel operating at a rate substantially equal to the sum of the rates of the interleaved parallel channels.

Another object of some exemplary embodiments of the present invention is to provide a rate increase device to increase the rate of periodic optical signals.

Yet another object of some exemplary embodiments of the present invention is to provide high rate modulated streams of pulses using optical choppers.

In one exemplary version, the present invention provides an all optical system for generating high rate modulated signals including:

a generator for generating a first periodic signal at a first rate;

a rate increasing device arranged to receive the first periodic signal and to produce a second periodic signal at a second rate that is higher than the first rate;

a splitting device to receive and split the second periodic signal into multiple images of the second periodic signal propagating along multiple optical paths, the multiple optical paths including optical modulators to modulate the images of the second periodic signal at the second rate to produce modulated signals; and an interleaving device to receive and interleave the modulated signals to produce a stream of modulated signal having a third rate higher than the second rate.

In another exemplary version, the present invention provides an all optical system for generating high rate modulated signals including:

a generator for generating a first periodic signal at a first rate;

an optical chopping device arranged to receive the first periodic signal and to produce a second periodic signal having pulses that are narrower than the pulses of the first signal;

a splitting device for receiving and splitting the second periodic signal into multiple images of the second periodic signal propagating along multiple optical paths, the multiple optical paths including optical modulators for modulating the images of the second periodic signal at the first rate to produce modulated signals;

an interleaving device for receiving and interleaving the modulated signals to produce a stream of modulated signal having a second rate higher than the first rate.

In an alternative exemplary version, the present invention provides an optical rate increasing device including:

an optical loop including an optical amplifier and a gate and having a first and a second terminals, the optical loop arranged to receive a first periodic signal from the first terminal and to produce at the second terminal a second periodic signal, wherein the rate of the second periodic signal is higher than the rate of the first periodic signal.

In yet another exemplary version, the present invention provides an all-optical system for interleaving the signals of multiple information channels including:

multiple optical chopping devices arranged along multiple optical paths to receive and chop the pulses of a first group of information channels and to produce a second group of information channels having pulses that are narrower than the pulses of the first group of information channels; and an interleaving device to receive and interleave the second group of signals from the multiple optical paths and to produce an information channel operating at a rate higher that the rate of each of the information channels of the first group.

BRIEF DESCRIPTION OF THE DRAWINGS

The present invention will be understood and appreciated more fully from the following detailed description of embodiments of the invention, taken in conjunction with the accompanying drawings in which:

FIG. 2b is a schematic illustration of a symbol representing the device of FIG. 2a;

FIG. 6d is a schematic illustration of a modulated stream of pulses produced at the output of the system of FIG. 6c when this system receives, at its input, the stream of pulses of FIG. 6a;

DETAILED DESCRIPTION OF EMBODIMENTS OF THE INVENTION

I. Rate Multipliers of Streams of Narrow Pulses

Figure 1:
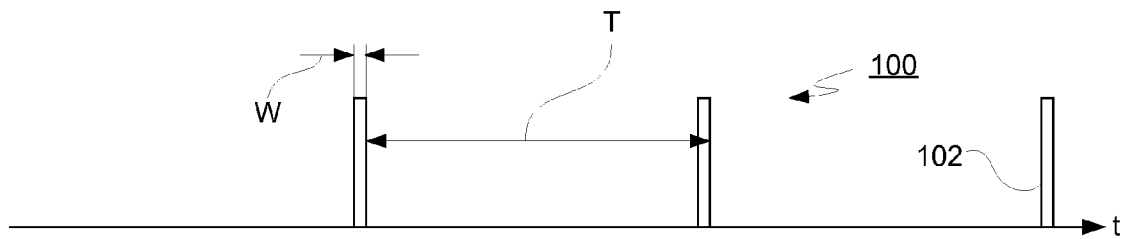
FIG. 1 is a schematic illustration of a stream of pulses, such as, produced by a Mode Locked Laser (MLL) that their time width is narrower than the periodic time space between them.

FIG. 1 illustrates a bit stream 100 generated by a Mode Locked Laser (MLL). The propagation of pulses 102 in stream 100 having time width W is illustrated along time axis t having arbitrary units. Stream 100 is characterized by extremely narrow pulses (narrow width W) and relatively large periodical spacing T between pulses 102. Accordingly, stream 100 propagates with relatively low frequency, resulting in low duty cycle (low filling factor W/T<<1). While the pulses width W is very narrow and thus very attractive for being used in high transmission rate of information, the rate of the pulses produced by the MLL is far from being suitable for this purpose.

Figure 2A:
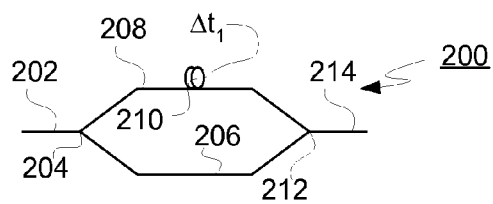
FIG. 2a schematically illustrates a rate multiplier device used to increase the pulse rate in stream, such as, the streams of FIG. 1.

FIG. 2a illustrates a device 200 for multiplying the pulse rate in a stream of pulses. Device 200 includes input 202 for receiving a stream of pulses, such as for example, stream 100 of FIG. 1. The pulses received at input 202 are split equally, by splitter (coupler) 204 into similar stream of pulses propagating in branches of radiation guides 206 and 208. The stream of pulses that propagates in branch 208 is delayed, by delay line 210, in the amount of $\Delta t_1$. Combiner (coupler) 212 combines and interleaves the pulse stream received from non-delayed branch 206 with the delayed pulse stream received from branch 208 to produce, at port 214, a combined interleaved stream of pulses having pulse rate that is higher than the original pulse rate of the stream of pulses received at input 202.

Figure 2B:

FIG. 2b schematically illustrates a symbol representation 220 of device 200 of FIG. 2a, having input 222 and output 224, corresponding to input 202 and output 214 of device 200, respectively. Schematic symbol 220 represents a device that performs a function similar to the function of device 200, i.e.

rate multiplying. The amount of time delay $\Delta t_1$ produced by delay line 210 in device 220 of FIG. 2a is indicated by the label $\Delta t_1$ written inside symbol 220.

Figure 3:
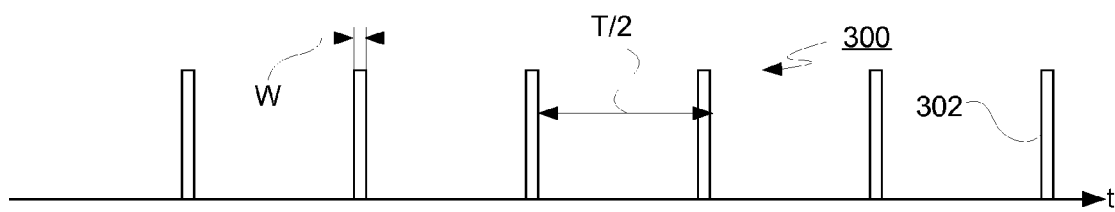
FIG. 3 is a schematic illustration of a pulse stream produced at the output of the rate multiplier device of FIGS. 2a and 2b when it receives, in its input, the pulse stream illustrated by FIG. 1.

FIG. 3 illustrates an output stream 300 of pulses 302, such as, the stream of pulses that is produced by device 200 of FIG. 2a and device 220 of FIG. 2b at their respective outputs 214 and 224, when a stream of pulses 100 of FIG. 1 is received at inputs 202 and 222, respectively. Stream 300 is illustrated along time axis t with arbitrary units. When the time delay $\Delta t_1$ of delay line 210 of FIG. 2a is set to be equal to half of the time period T of stream 100 of FIG. 1, combiner 212 of FIG. 2a produces pulse stream 300 at port 214 with a time period of T/2, resulting in a pulse stream 300 having double the frequency of stream 100.

Figure 4A:
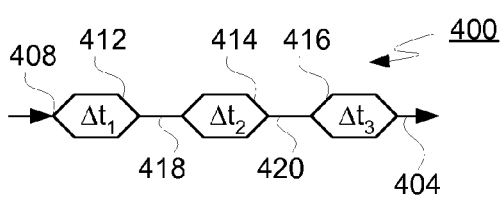
FIGS. 4a and 4b schematically illustrate rate multiplying systems including modular units of rate multiplier devices, such as, the devices of FIGS. 2a and 2b combined by combinations of serial and parallel connections.
Figure 4B:
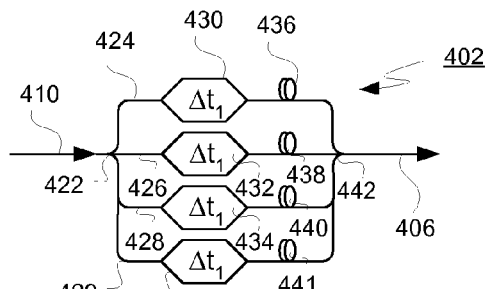
Figure 5:
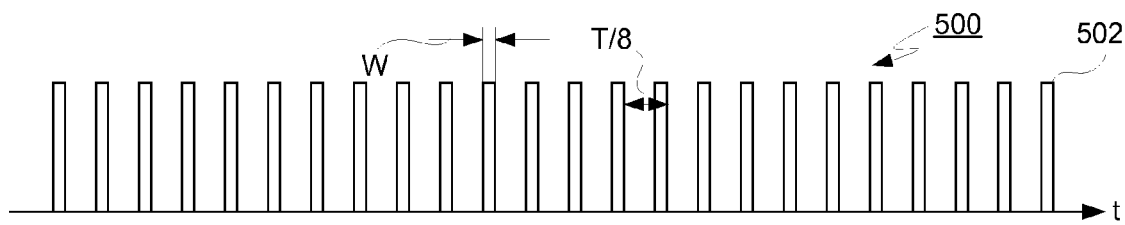
FIG. 5 is a schematic illustration of a stream of pulses produced at the output of the rate multiplying systems illustrated by FIGS. 4a and 4b.

Referring to FIGS. 4a, 4b and 5, FIGS. 4a and 4b illustrate devices/systems 400 and 402, respectively, achieving the same functionality of multiplying the pulse rate. FIG. 5 shows the output stream received at outputs 404 and 406 of devices 400 and 402, respectively, when stream 100 of FIG. 1 is received at inputs 408 and 410, respectively.

FIG. 4a illustrates rate multiplier 400 including multipliers 412, 414 and 416 connected in series and characterized by delays $\Delta t_1$, $\Delta t_2$ and $\Delta t3$ equal to T/2, T/4 and T/8, respectively. Device 412 output is connected to device 414 input by guide 418 and device 414 output is connected to device 416 input by guide 420. Device 412 having delay $\Delta t_1=T/2$ receives, at input 408, stream 100 of FIG. 1 having time period T and produces, at guide 418, a stream of pulses similar to stream 300 of FIG. 3 having double the frequency of stream 100 and time period T/2. Device 414 having delay $\Delta t_2=T/4$ receives, from guide 418, stream like stream 300 of FIG. 3 having time period T/2 and produces, at guide 420, a stream of pulses having double the frequency of stream 300 and time period T/4. Similarly, device 416 having delay $\Delta t_3=T/8$ receives, from guide 420, stream of pulses having time period T/4 and produces, at output 404, a stream of pulses having double the frequency of the stream in guide 420 and a time period T/8. In general, n modular devices 220 of FIG. 2b, such as, units 412, 414 and 416 of FIG. 4a, connected in series, each having a time delay of $\Delta t_i=T/(2^i)$ where i is the device index (i spans from 1 to n), produce a stream at the output having frequency that is multiplied by a factor $2^n$ of the stream at its input.

Modular devices 220 of FIG. 2b may be connected in any combination of serial and parallel connections, such as the combinations of device 402 illustrated by FIG. 4b brought here as an example. Device 402 may receive at its input 410, a stream of pulses like stream 100 of FIG. 1. The received stream is split, by splitter 422, into guide branches 424, 426, 428 and 429 including multipliers 430, 432, 434 and 435, respectively. Multipliers 430, 432, 434 and 435 having time delay $\Delta t_1=T/2$ which is half of the time period T of stream 100. Accordingly, the pulse rate after multipliers 430, 432, 434 and 435 at each branch 424, 426, 428 and 429, respectively, is double the rate of stream 100 at input 410. The streams with the multiplied rate at branches 424, 426, 428 and 429 may be delayed, by delay lines 436, 438, 440 and 441, respectively. The delayed streams from branches 424, 426, 428 and 429 are combined with equal spaces, by combiner 442 to create interleaved streams, at output 406, propagating as a serial stream that its rate is higher than the pulse rate of stream 100 at input 410. The time period of the pulses of the streams at branches 424, 426, 428 and 429 after multipliers 430, 432, 434 and 435, respectively, is T/2. This time space should be divided between four interleaved streams arriving from branches 424, 426, 428 and 429. Accordingly, each stream from branches 424, 426, 428 and 429 should be shifted in time by an amount of $$\frac{T/2}{4} = T/8$$

relative to its adjacent streams. Thus delay lines 436, 438, 440 and 441 may be adjusted to create time delays $\tau$, $\tau+T/8$, $\tau+2T/8$, $\tau+3T/8$, respectively, where $\tau$ may be chosen arbitrarily.

It can be seen that both rate multiplier 400 of FIG. 4a and rate multiplier 402 of FIG. 4b increase the rate of the pulses by a factor of 8.

FIG. 5 illustrates a stream of pulses 500 including pulses 502 having width W that are separated by time period T/8 and propagate along time axis t having arbitrary units. Stream 500 is produced at ports 404 and 406 of devices 400 and 402, respectively, in a situation where stream 100 is received at respective inputs 408 and 410 and its rate is increased by a factor of 8 to produce the rate of stream 500. The width W of pulses 102 of FIG. 1, producing stream 100, and pulses 502 of FIG. 5, producing stream 500, is the same.

The rate increase by devices, such as devices 400 and 402, is not limited to a factor of 8 and any factor may be achieved depends on the number of modular units 220 of FIG. 2b used in the configuration of the multiplying devices.

II. Rate Multipliers for Streams of Narrow Pulses Combined with Modulation Interleaving System Referring to FIGS. 6a-6d, FIG. 6c illustrates a high rate modulation system 700 including illustrations of FIGS. 6a, 6b and 6d of the pulse streams at various locations along system 700.

Figure 6A:
FIGS. 6a and 6b illustrate the stream of pulses before and after the rate multiplying system of FIG. 6c, respectively.

FIG. 6a illustrates stream of pulses 600 similar to stream 100 of FIG. 1 including very narrow pulses 602 separated by a time period T and having width W. Stream 600 is illustrated along time axis t having arbitrary units.

Figure 6B:
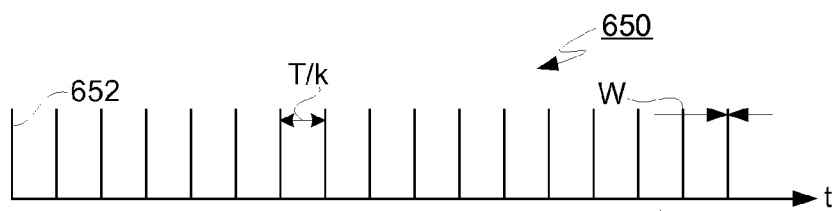

FIG. 6b shows stream of pulses 650 including pulses 652 having the same width W and the same amplitude of pulses 602 of stream 600 of FIG. 6a. The time period in which pulses 652 are separated is T/k. Accordingly, stream 650 may represent a stream 600 that its pulse rate is increased by a factor k.

Figure 6C:
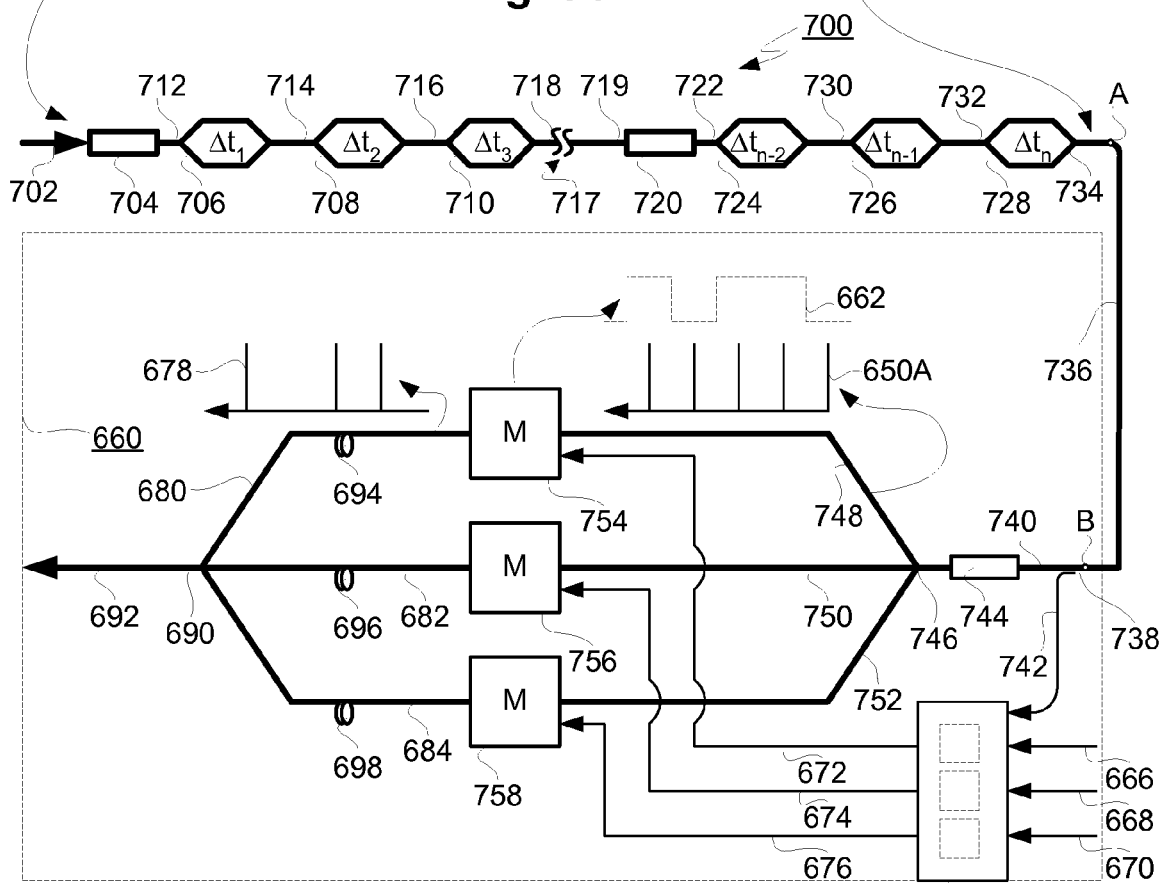
FIG. 6c is a schematic illustration of a system for producing high rate modulated stream of pulses having a pulse rate that is higher than the rate of the modulators used to produce it.

FIG. 6c illustrates system 700 for producing a high rate modulated stream of pulses having a rate that is higher than the rate of modulators 754, 756 and 758 used in system 700. System 700 may include optical guides and electrical leads. To ease the differentiation between the optical guides and the electrical leads, the optical guides are illustrated by lines that are wider than the lines used to illustrate the electrical leads.

Input 702 receives stream 600 of FIG. 6a of very narrow pulses at relatively low rate that may be produced by a MLL (not shown). Stream 600 may be amplified by optical amplifiers, such as, amplifier 704 and 720 and its rate is increased by rate multipliers, such as, multipliers 706, 708, 710, 724, 726 and 728 connected by guides 712, 714, 716, 718, 719, 722, 730, 732 and 734. Broken lines 717 indicate that part of system 700 between lines 717 is not illustrated and only part of the system structure is illustrated in the segment between input 702 and connecting point A. Accordingly it should be clear that the segment between input 702 and connecting point A may include many amplifiers, such as, amplifiers 704 and 720 and n rate multipliers, such as, multipliers 706, 708, 710, 724, 726 and 728 connected by guides 712, 714, 716, 718, 719, 722, 730, 732 and 734, respectively. The index i of the rate multiplier starts with i=1 for multiplier 706 and ends with i=n for multiplier 728. The time delay characterizing each of the rate multiplier is given by its index i and is equal to $\Delta t_i = T/(2^i)$. Thus when the index i of multiplier 728 equals to n, the rate increase between input 702 and point A is $2^n$, defined as k. Since the rate multiplication between input 702 and point A involves energy splitting between split and interleaved streams, it is clear that amplification should be used to maintain the amplitude of the stream at point A to be equal to the initial amplitude of the stream at input 702. Accordingly, in a situation where the total amplification of the amplifiers between input 702 and point A is adjusted to maintain the same amplitudes for the pulses in the streams at input 702 and point A and when the rate, between input 702 and point A, is increased by a factor equal to k, then the signal at input 702 may be represented by stream 600 of FIG. 6*a* and the signal at point A may be represented by stream 650 of FIG. 6*b*.

Signal 650, received from point A, is transmitted by guide 736 into point B which is the input of subsystem 660. From point B, stream 650 propagates along guide 740, through coupler 738 and via amplifier 744 into splitter 746. Splitter 746 splits stream 650 into similar streams 650A, 650B and 650C propagating along guides 748, 750 and 752, respectively. For the clarity of the drawing and to avoid crowdedness, only stream 650A in guide 748 is illustrated and streams 650B and 650C in guides 750 and 752, respectively, are not shown. The amplification of amplifier 744 may be adjusted to produce amplification that will produce streams 650A-650C having amplitudes similar to the amplitudes of streams 600 and 650 at input 702 and point A, respectively.

Streams 650A, 650B and 650C have the same pulse rate as the pulse rate of stream 650 at point A and are received by modulators 754, 756 and 758, respectively. The time period of streams 650A-650C should be equal or longer than the time window of modulators 754, 756 and 758. Under this condition, modulators 754, 756 and 758 may transmit or block, individually, any single pulse in streams 650A-650C to generate, from streams 650A-650C, any desired pattern of modulated stream signal. It should be clear that even when the rate of the pulses in streams 650A-650C was increased by a factor of k relative to the initial rate of stream 600 at input 702, still the width of the pulses W in streams 650A-650C is smaller and may be much smaller than the time space T/k between the pulses in these streams. The requirement for W<T/k is necessary to allow the interleaving of streams 650A-650C. It also should be clear that even when the rate of the pulses in streams 650A-650C was increased by a factor of k relative to the initial rate of stream 600 at input 702, still the time windowing of modulators 754, 756 and 758 is narrower than the time space T/k between the pulses of streams 650A-650C. Thus any single pulse in streams 650A-650C may be blocked or transmitted by modulators 754, 756 and 758, respectively.

An example of a modulation function of modulator 754 is schematically illustrated by graph 662. Modulation function 662 demonstrates the ability of modulator 754 to block or transmit any single pulse in stream 650A. Modulators 754, 756 and 758 are controlled individually by controller 664. Controller 664 receives electrical signals from electronic channels 666, 668 and 670. Controller 664 may include buffer and processor for storing and efficiently rearranging data received from channels 666, 668 and 670. Modulators 754, 756 and 758 are controlled, by controller 664, and each of them is controlled individually and according to the information received by individual electronic channels 666, 668 and 670 received by controller 664, respectively.

According to the data received from channels 666, 668 and 670, controller 664 produces control signals sent through leads 672, 674 and 676 to control modulators 754, 756 and 758, respectively. Each of modulators 754, 756 and 758 produces, according to the control signals that it receives from controller 664, a transmission function similar to transmission function 662 of modulator 754.

Stream 650A appears, in guide 680, after modulator 754, as modulated stream 678. Similarly streams 650B and 650C appear, in guides 682 and 684, after modulators 756 and 758 as streams 686 and 688, respectively, (not shown). Streams 678, 686 and 688 are combined from guides 680, 682 and 684, respectively and interleaved by combiner 690 to produce serial stream of pulses, at port 692, at a rate that is higher from both the rate of stream 650 and the rate of modulators 754, 756 and 758.

Delay lines 694, 696 and 698 are arranged to produce time delays that adjust the interleaving of modulated streams 678, 686 and 688, respectively, to be with equal time space between interleaved streams 678, 686 and 688. Delay lines 794, 796 and 798 may be removed from guides 680, 682 and 684, respectively, if the proper delays between streams 678, 686 and 688 may be produced electronically by controller 664.

Part of stream 650 is tapped into guide 742, by coupler 738, to provide synchronization signal into controller 664 to produce synchronization between modulators 754, 756 and 758 and streams 650A, 659B and 650C, respectively.

Subsystem 660 is illustrated by a specific example including three interleaved channels 678, 686 and 688. However, system 660 may include more interleaved channels. The maximum number of channels that can be interleaved is given by the ratio between the time period of streams 650A-650C and twice the pulse width $$\frac{T/k}{2W}.$$

This means that the rate at port 692 may be higher than the rate of modulators 754, 756 and 758 by a factor of $$\frac{1}{2W}$$

where W<<1. In this case the delay between two adjacent streams, interleaved by combiner 690, should be 2W. Thus, in a situation where the maximum rate at port 690 is achieved, the delays produced in guides like guides 680, 682 and 684, by delay lines like 694, 696 and 698 or by controller 664 should be an integral numbers of 2W and are given by 2·W·i where i is the index of the interleaved channels.

Figure 6D:

FIG. 6*d* illustrates modulated and interleaved stream 800 that appears in port 692 of FIG. 6*c*. Stream 800 is illustrated along time axis t having arbitrary units. Stream 800 may have a pulse rate that is higher than the rate of modulators 754, 756 and 758 of FIG. 6*c*, used to produce stream 800. In addition pulses 802 of stream 800 are narrower than the time window of modulators 754, 756 and 758 of FIG. 6*c*, used to produce stream 800. The amplitude of pulses 802 may be equal to the amplitude of pulses 602 received at input 702.

Subsystem 660 of FIG. 6*c* receives stream 650 when the duty-factor of stream 650 is much smaller than 1. Accordingly, several streams like stream 650 can be modulated individually and can be interleaved into one serial stream 800 having a modulation rate that is higher than the modulation rates of the modulators used to produce it.

III. Using a Loop to Duplicate Pulses

Figure 7A:
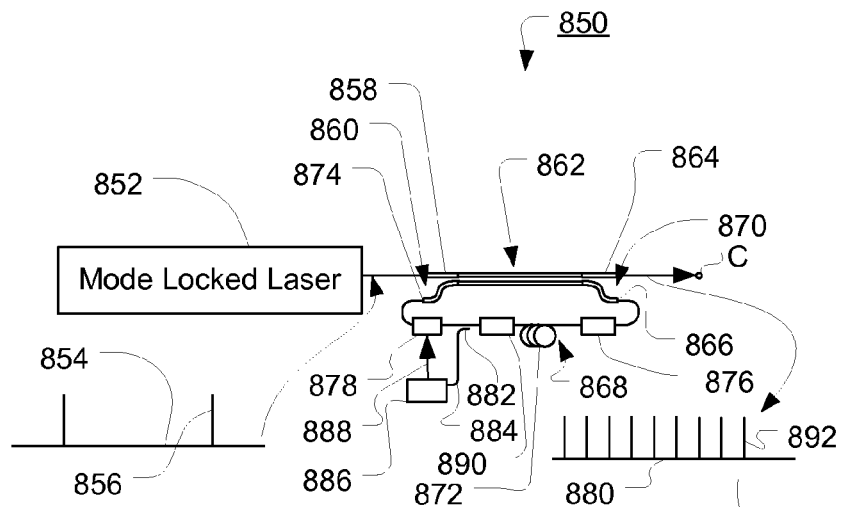
FIG. 7a is a schematic illustration of rate multiplier device including MLL and a loop.

In another alternative, FIG. 7a illustrates another system 850 used to increase the pulse rate of narrow pulses 856 in a relatively low rate stream 854. The rate of stream 854 may be increased up to the rate limit equal to the rate of modulators 754, 756 and 758 used in sub-system 660 of system 700 of FIG. 6c.

System 850, including a single mode locked laser 852 as shown in FIG. 7a, feeds a signal stream 854 into upper branch 858 of input 860 of directional coupler 862. Input branch 858 is coupled to upper and lower branches 864 and 866 of output 870 via coupler 862. Lower output branch 866 is connected, by loop 868, to lower input branch 874 of input 860. Loop 868 includes amplifier 876, adjustable delay loop 872, threshold device 890 and gate 878. At a certain starting time, the first pulse signal 856 is received by the upper branch 858 of input 860 of coupler 862. Directional coupler 862 divides the energy of each pulse, as pulse 856, that are part of signal stream 854 into an output pulse propagating through output branch 864 and a returned pulse propagating toward loop 868 via output branch 866. A portion of the energy of pulse signal 854 is directed through output 864 and appears as the first output signal of device 850. The other part of the energy of signal 854 enters into the loop 868 which sends its energy back to input branch 874 at input 860. The part of pulse signal 854 that propagates along loop 868 (the returned signal) is amplified by amplifier 876 and passes through delay loop 872, threshold device 890 and gate 878 to return to input branch 874 of coupler 862.

The returned part of signal stream 854 that returned to input branch 874, through loop 868, is divided, by coupler 862 into an output signal at the upper branch 864 and a returned signal directed back into loop 868. This process may repeat itself in a steady-state condition to produce a train of duplicated narrow output signals. To provide a steady train of pulses, the intensity of all the re-circulating pulses should be equal to the first signal that entered loop 868. In addition, the first output signal, at output branch 864 of output 870, should be equal to the next output pulses that follow after the delay imposed by loop 868. Thus, each fraction of the energy from each pulse 856 that leaves at 864 is followed by another portion that is re-circulating through the loop 868 resulting in a continuous train of pulses.

The re-circulating pulse may be amplified by an amplifier 876. A delay loop 872 determines the spacing between an exiting pulse and the following pulse that flows through the loop 868. The amplification of amplifier 876 and energy partitioning of coupling of the directional coupler 862, adjusted to ensure that the output pulse train, exiting at output branch 864, has substantially the same amplitude. For example, this may be obtained if the coupler is of a type characterized by 50/50 power splitting and the amplifier 876 has a gain that compensates for loop loss (including propagation and bend loss) and coupler loss (50%) to assure that the product between the combined effect of gain and the overall attenuation loss of a round trip along the loop 868 is equal to one.

The requirement for a net gain that is equal exactly to 1 may lead to instability, in system 850, due to gain fluctuations of amplifier 876. To fulfill the requirement for a net gain equals 1 in a robust way, amplifier 876 may be operated in a mode that it is saturated by the return signal in loop 868. In this situation the gain of amplifier 876 is clamped and fixed, resulting with a stable system 850. However, loop 868 serves as a feedback loop for amplifier 876 that may cause amplifier 876 to oscillate and to operate as a laser. To avoid such a situation, threshold device 890 may be used. Device 890 may be of any type of optical threshold device and in particular may be of the type, such as, the threshold devices disclosed in U.S. patent application Ser. Nos. 10/404,140 and 10/404,077, filed Apr. 2, 2003, entitled "Optical Threshold Devices and Method", (see "Cross Reference to Related Applications" section above) which are completely incorporated here by reference. Threshold device 890 may be used to block the evolving of the spontaneous radiation, emitted by amplifier 876, into a lasing mode.

In steady state, the process of duplicating the pulses by loop 868 produces a train of identical narrow pulses. This process continues till another pulse 856 appears in the output 854 of the MLL laser 852. Just before the appearance of such a pulse, gate 878 may be turned activated to stop recirculation of a pulse in the loop 868. After the termination of the pulse duplication and before the arrival of the next pulse 856, gate 878 is activated to block the pulse circulating in loop 868 and to allow the beginning of a new duplication process. As explained, this process continues till the next activation of gate 878 and the appearance of the next pulse of signal stream 854. Gate 878 can be a shutter, an LCD window, a coherent summer receiving light from a source such that the pulse in the loop 868 is canceled, or any suitable device. It should be clear that the activation of gate 878 may take place just before the arrival of the next following pulse 856 from MLL 852, or alternatively may take place just before the arrival of any other pulse 856.

The time interval between duplicated pulses is the time space between duplicated pulses and is equal to the total delay of loop 868. To create an equally spaced train of pulses, the space between two following pulses 856 of signal stream 854 should be equal to an integral number of spaces between duplicated pulses. The delay of loop 868 has to satisfy this condition by adjusting the delay of loop 872.

Gate 878 is activated to halt the last pulse to be repeated before a new pulse is generated by the mode locked laser 852. Gate 878 is deactivated to allow the passage of the new pulse generated by laser 852 which propagates in loop 868. Thus, a narrow train of pulses 880 can be generated with only one delay device.

Gate 878 is activated by controller 886 via electronic lead 888. Controller 886 receives a synchronization signal tapped from loop 868, by coupler 882 and directed to controller 886 by guide 884. Controller 886 activates gate 878 to block the duplicated pulse existing in loop 868 just before the arrival of another pulse 856 and to open gate 878 upon the first newly returned pulse in loop 868. The time between the activations of gate 878 may be periodic and synchronized according to the signal tapped and fed from loop 868 into controller 886.

System 850 produces a stream 880 that consists of very narrow pulses 892 separated by time space that is larger than their width. The rate of pulses 892 may be high up to the rate of the modulators used to modulate stream 880. Accordingly, stream 880 is similar to streams 650 of FIG. 6b and streams 650A-650C of FIG. 6c. Thus, stream 880 may be modulated, by subsystem 660 of FIG. 6c to produce a stream like stream 800 of FIG. 6d in which the rate of modulated pulses 802 in stream 800 is higher than the rate of pulses 652 in stream 650 of FIG. 6b and the rate of modulators 754, 756 and 758 of system 660.

Figure 7B:
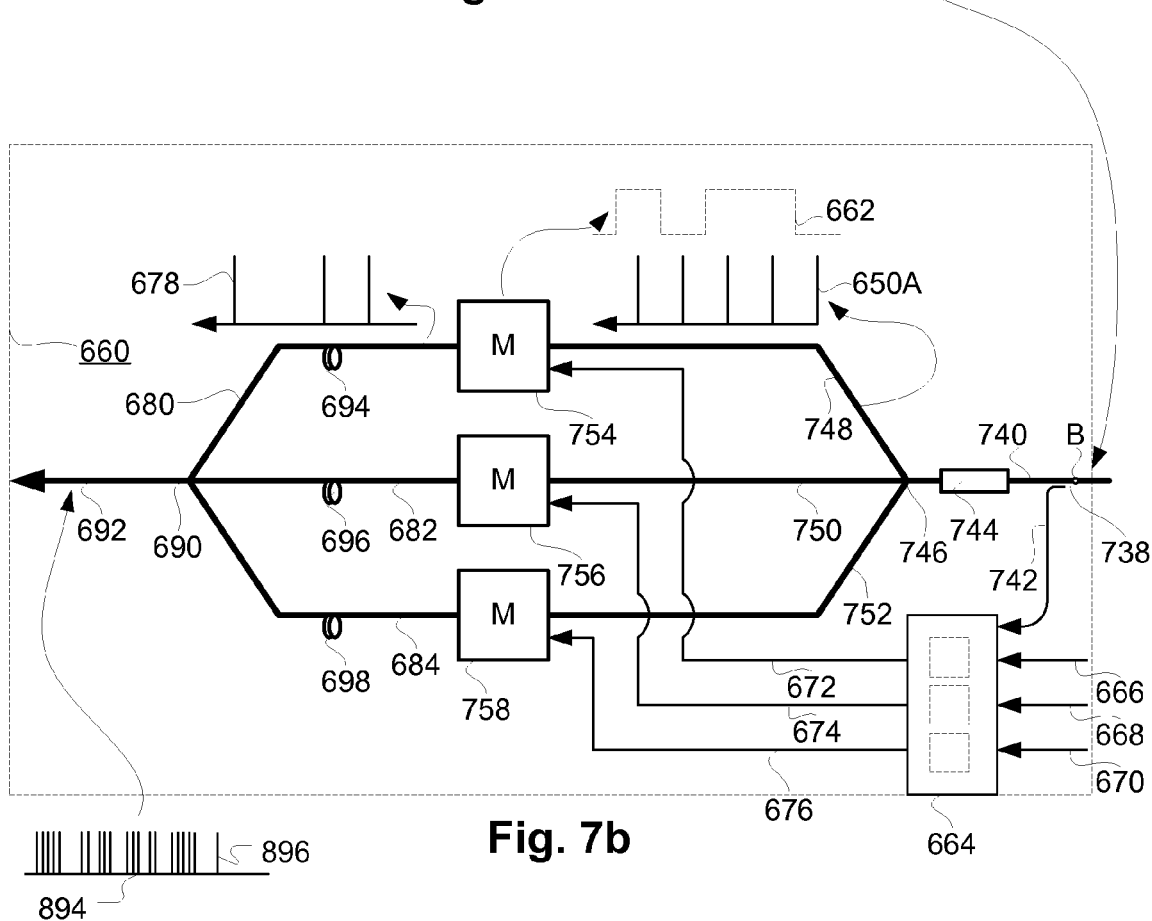
FIG. 7b schematically illustrates a system that is a part of the system of FIG. 6c designed for producing high rate modulated signals using modulation and interleaving of narrow pulses.

FIG. 7b illustrates subsystem 660 of FIG. 6c in a situation where system 660 receives, from point C of system 850 of FIG. 7a, into its point B, a stream 880 similar to stream 650 of FIG. 6b and produces at its output 692 a modulated stream 894 similar to stream 800 of FIG. 6d, in which the rate of modulated pulses 896 in stream 894 is higher than the rate of pulses 892 in stream 880 and the rate of modulators 754, 756 and 758 of system 660.

Subsystem 660 of FIG. 7*b* receives stream 880 where the duty-factor of stream 880 is much smaller than 1. Accordingly, several streams like stream 880 can be modulated individually and can be interleaved into one serial stream 894 having modulation rate that is higher than the modulation rate of the modulators used to produce it.

Figure 8:
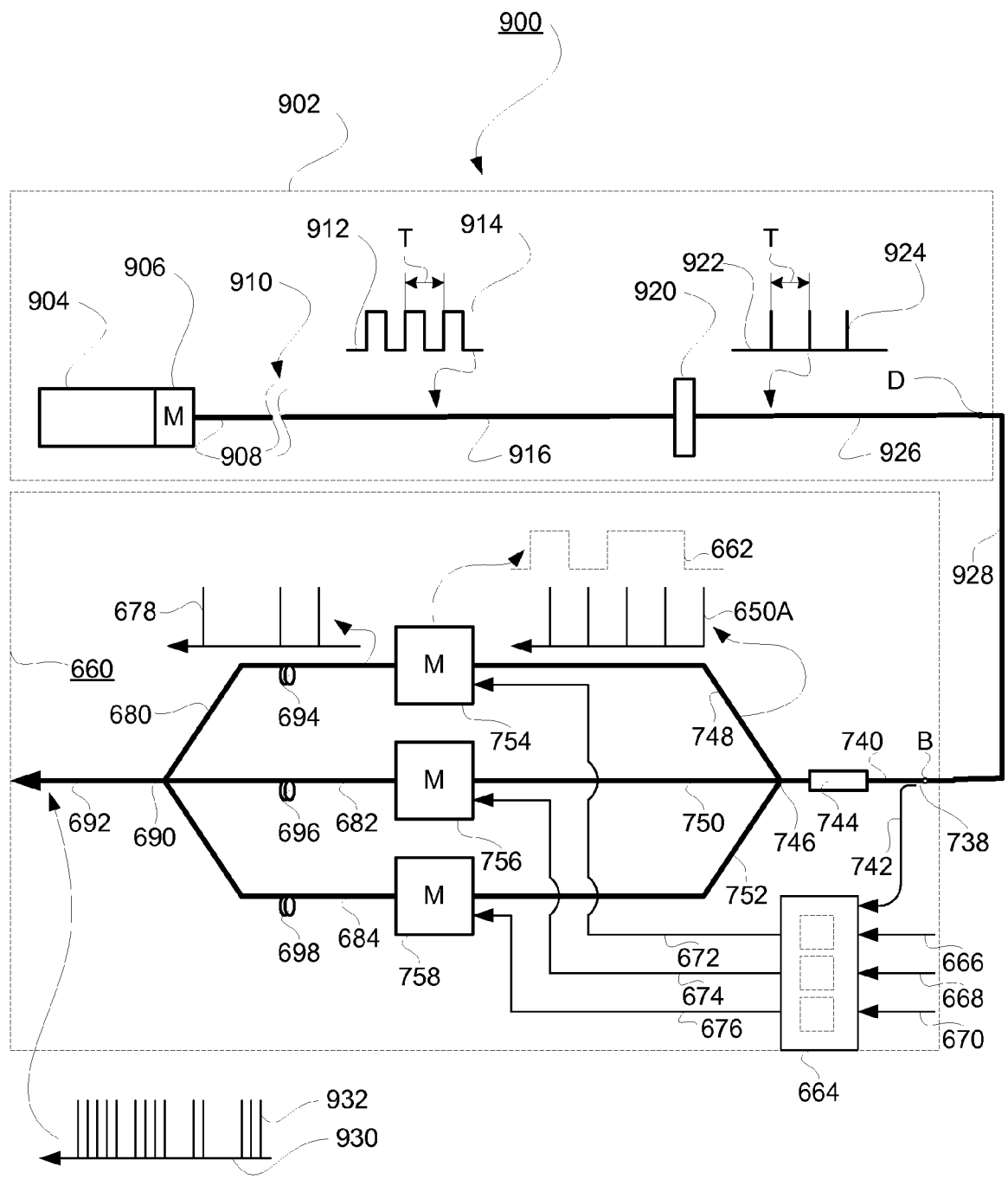
FIG. 8 is a schematic illustration of a system designed for producing high rate modulated signals using modulated laser and optical chopper.

IV. Rate Multipliers Using Optical Choppers Combined with Modulation Interleaving Systems FIG. 8 illustrates system 900 operating in an alternative way of producing a modulated stream of pulses at a rate that is higher than the maximum modulation rate of the modulators used. System 900 includes two subsystems, system 902 and system 660 connected in series by guide 928 that connects point D of subsystem 902 with point B of subsystem 660. Subsystem 660 of system 900 of FIG. 8 is the same subsystem 660 used in systems 700 of FIG. 6*c* and subsystem 660 of FIG. 7*b*.

Subsystem 902 of system 900 includes light source 904. Source 904 may be a modulated laser that is modulated directly or alternatively, as illustrated, may be a CW laser that is modulated externally by modulator 906. The modulated signal produced, by laser 904 and modulator 906 is coupled into guide 908 and propagates from there to guide 916 to appear there as stream 912 including pulses 914. Guides 908 and 916 are illustrated by a discontinuity represented by a gap confined by lines 910, to indicate that laser 904, modulator 906 and guide 908 may be in close vicinity or far away from guide 916.

The rate of pulses 914 in stream 912 produced by laser 904 and modulator 906 should not exceed the rate of modulators 754, 756 and 758 of subsystem 660. Accordingly, modulator 906 of subsystem 902 and modulators 754, 756 and 758 of subsystem 660 may be operated at the same rate and at a rate which is the maximum that can be achieved by available modulators.

Pulses 914 form stream 912 by a continuous stream of pulses that appear one after the other in a constant time period T. The continuous stream of pulses 914 is needed to allow further modulation, by modulators 754, 756 and 758 of subsystem 660, of pulses 914 after these pulses are chopped by chopper 920. Chopper 920 may be of any type of optical chopper and in particular of the types disclosed in U.S. Provisional Patent Application Ser. No. 60/472,776, filed May 23, 2003, entitled "Generating of High Rate Modulated Pulse Streams" (see "Cross Reference to Related Applications" section above); U.S. patent application Ser. No. 10/472,244, filed Sep. 22, 2003, entitled "Optical Pulse Chopper" (see "Cross Reference to Related Applications" section above); U.S. patent application Ser. No. 10/826,363, filed Apr. 19, 2004, entitled "All Optical Chopping For Shaping and Reshaping, Apparatus and Method", (see "Cross Reference to Related Applications" section above); U.S. patent application Ser. No. 10/827,314, filed Apr. 20, 2004, entitled "All Optical Chopping Using Logic Gates Apparatus and Method" (see "Cross Reference to Related Applications" section above) and U.S. patent application invented by Arie Shahar and Eldan Halberthal, filed Apr. 29, 2004, entitled "All Optical Chromatic and Polarization Mode Dispersion Correctors" (see "Cross Reference to Related Applications" section above) which all of them are thoroughly incorporated here by their reference.

Chopper 920 receives pulses 914 of stream 912 from guide 916 and chops pulses 914 into narrower pulses 924 of stream 922 propagating in guide 926. For example, chopper 920 may produce pulse 924 of stream 922 by chopping out part of the energy of pulses 914 of stream 916, such that pulse 924 of stream 922 include a chopped portion of pulse 914 of stream 916, e.g., as described in the above-referenced U.S. patent applications Ser. Nos. 10/826,363 and/or 10/834,343. While chopped pulses 924 of stream 922 in guide 926 may be much narrower then pre-chopped pulses 914 of stream 912 in guide 916, the time period T between pulses 924 is the same as the time period T between pulses 914.

Stream 922 may have a duty factor that is much smaller than 1 indicating that the time period T of pulses 924 may be much bigger than the width W of pulses 924. In such a situation when the duty-factor of stream 922 is much smaller than 1, several streams like stream 922 can be modulated individually and can be interleaved into one serial stream having modulation rate that is higher than the modulation rate of the modulators used to produce it. Such a process is performed by subsystem 660.

Accordingly, stream 922 is received, by subsystem 660, at point B from guide 928 that carries stream 922 from point D. As illustrated in FIGS. 6*c* and 7*b* and explained in their accompanied descriptions, subsystem 660 may receive stream 922, similar to streams 650 and 880 of FIGS. 6*c* and 7*b*, respectively, and convert it into modulated stream 930 having pulses 932 that are modulated at a rate that is higher than the rate of modulators 754, 756 and 758 of subsystem 660. Stream 930 produced by subsystem 660 is similar to streams 800 and 894 of FIGS. 6*c* and 7*b*, respectively, also produced by subsystem 660.

V. Rate Converters

Figure 9:
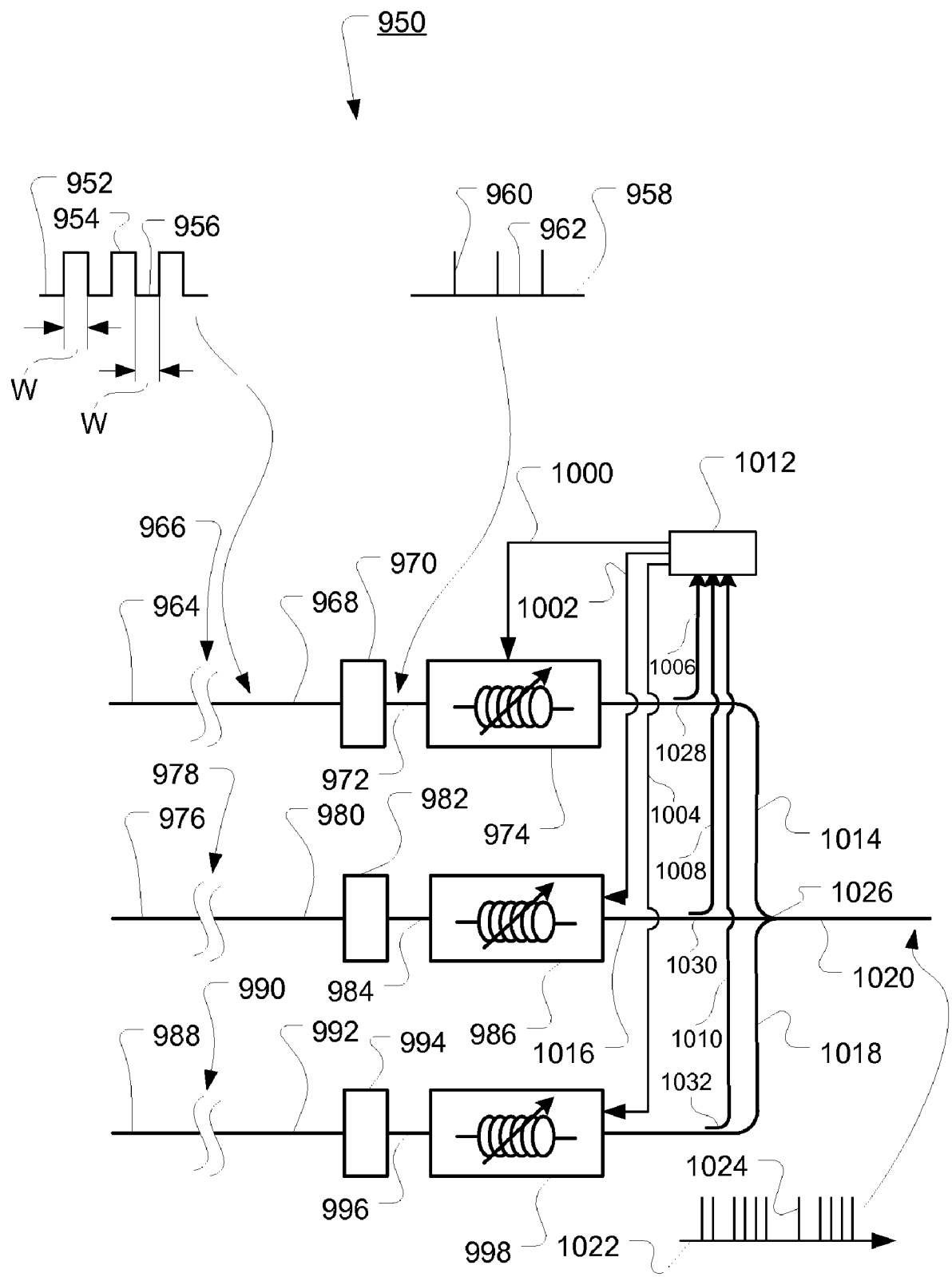
FIG. 9 is a schematic illustration of a rate conversion system including optical choppers capable of interleaving multiple parallel information channels into a serial information channel operating at a rate equal to the sum of the rates of the interleaved channels.

FIG. 9 illustrates system 950 including optical receiving branches 964, 976 and 988. Branches 964, 976 and 988 may receive modulated streams of pulses for carrying these streams to guides 968, 980 and 992, respectively. The discontinuity gaps between guides 964 and 968, 976 and 980 and 988 and 992 confined by lines 966, 978 and 990 of branches 964, 976 and 988, respectively, indicates that guides 964, 976 and 988 may be in close vicinity or far away from guides 968, 980 and 992, respectively. Guides 968, 980 and 992 transmit to optical choppers 970, 982 and 994, respectively, the modulated signals, such as modulated signal 952 illustrated at guide 968.

Streams, like signal stream 952, propagating along branches 964, 976 and 988 may be modulated by Return to Zero (RZ) format in which pulses 954 and spaces 956 have the same time width W. Choppers 970, 982 and 994 receive from respective guides 968, 980 and 992 the modulated signals, like signal 952, and chop their pulses, such as pulses 954, by a factor of $k_1$, to produce narrower pulses, such as pulses 960 of stream 958 (shown, for example, at guide 972), at optical guides 972, 984 and 996, respectively.

Choppers 970, 982 and 994 may be of any type of optical chopper and in particular of the types disclosed in U.S. Provisional Patent Application Ser. No. 60/472,776, filed May 23, 2003, entitled "Generating of High Rate Modulated Pulse Streams", (see "Cross Reference to Related Applications" section above); U.S. patent application Ser. No. 10/472,244, filed Sep. 22, 2003, entitled "Optical Pulse Chopper" (see "Cross Reference to Related Applications" section above); U.S. patent application Ser. No. 10/826,363, filed Apr. 19, 2004, entitled "All Optical Chopping For Shaping and Reshaping, Apparatus and Method", (see "Cross Reference to Related Applications" section above); U.S. patent application Ser. No. 10/827,314, filed Apr. 20, 2004, entitled "All Optical Chopping Using Logic Gates Apparatus and Method" (see "Cross Reference to Related Applications" section above) and U.S. patent application invented by Arie Shahar and Eldan Halberthal, filed Apr. 29, 2004, entitled "All Optical Chromatic and Polarization Mode Dispersion Correctors" (see "Cross Reference to Related Applications" section above) which all of them are thoroughly incorporated here by their reference.

Stream 958 includes narrow pulses with a width of $W/k_1$ that are spaced by the amount of time period equal to 2W. Variable delay lines 974,986 and 998 receive from guides 972, 984 and 996, respectively, the chopped modulated stream of pulses, such as stream 958 and transmit these streams into guides 1014, 1016, 1018, respectively. Variable delay lines 974, 986 and 998 of branches 964, 976 and 988 are connected via couplers 1028, 1030 and 1032, by guides 1014, 1016, 1018, respectively, to optical combiner (coupler) 1026 having output port 1020. Combiner 1026 combines and interleaves modulated streams of narrow pulses, like stream 958, arrive from guides 1014, 1016 and 1018, to produce, at its output port 1020, serial stream 1022 of modulated narrow pulses 1024 having pulse rate that is higher than the pulse rate of the signals, like signal 952, received by any of the branches 964, 976 and 988.

While system 950 illustrates three parallel branches 964, 976 and 988 that their signal is chopped by choppers 970, 982 and 994, respectively, and interleaved, in equal spaces by combiner 1026, to produce a serial stream 1022 having a high pulse rate, the number of parallel branches may be equal to one over the chopping factor $k_1$ ($1/k_1$) of choppers 970, 982 and 994.

In a situation where signals, such as signal 952, arrive to parallel branches 964, 976 and 988 from independent sources and with clock synchronization that may vary, the delay time produced by variable delay lines 974, 986 and 998 should be controlled to assure equally spaced interleaving, by combiner 1026, of the signals, such as signal 958, arriving from guides 1014, 1016 and 1018 of branches 964, 976 and 988, respectively.

The space (the delay) between two adjacent interleaved signals should be equal to $2 \cdot W \cdot k_1$ and thus the time delay that the variable delay lines, in the parallel branches, should produce is given by $(2 \cdot W \cdot k_1) \cdot i$, where i is the index of the parallel branch. To control the time delay of the variable delay lines 974, 986 and 998, part of the signals propagating in guides 1014, 1016 and 1018 of respective branches 964, 976 and 988 is tapped by couplers 1028, 1030 and 1032 and is carried by guides 1006, 1008 and 1010, respectively, into controller 1012. Controller 1012 receives the tapped signals from guide 1006, 1008 and 1010 and in turn produces electronic signals in leads 1000, 1002 and 1004, respectively, for controlling the delays of variable delay lines 974, 986 and 998, respectively. In general, the time delay that each variable delay line produces should be greater by the amount of $2 \cdot W \cdot k_1$ with respect to the time delay of the variable delay line in the previous parallel branch. Controller 1012 controls the delay times of the variable delay lines to compensate for random fluctuations in the rate and arrival time of the signals in the different parallel branches. In this specific case where system 950 includes three parallel branches 964, 976 and 988, the chopping factor $k_1$ is ⅓ and the delay times produced by controller 1012 and variable delay lines 974,986 and 998 are τ, τ+2·W/3 and τ+4·W/3, respectively, where τ is arbitrary.

When signals, like signal 952, arrive to branches 964, 976 and 988 and are synchronized with respect to one clock and their generation is controlled with respect to this clock, they may be produced, by their generator or generators, with the proper delays suitable for the interleaving. In such a case variable delay lines 974, 986 and 998 may be adjusted to fixed time delays or may be removed from system 950 together with controller 1012, leads 1000, 1002 and 1004, guides 1006, 1008 and 10010, and couplers 1028, 1030 and 1032.

Output port 1020 may include an optical amplifier to compensate for the energy loss associated with the chopping process of choppers 972, 984 and 996.

It can be seen that the generators of high rate modulated stream of pulses and the rate converters designed according to the present invention are capable of producing interleaved serial stream of pulses at a rate that is higher than the rate of the parallel interleaved streams that they receive. The rate of the modulated pulses in the above mentioned stream is also higher than the rate of the modulators used to produce this stream.

All the embodiments according to the present, may include a continuous sequence of optical components connected by light guiding media such as, for example, optical fibers, planar waveguides, or planar circuits (PLC), which media may be fabricated using integrated optic techniques and/or on-chip manufacturing. Alternatively, All the embodiments according to the present may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators may include variable and/or adjustable components. It should be clear that all amplifiers may made of amplifying media and devices and in particular are made of SOA's, LOA's and EDFA's. It should be appreciated that all attenuators are made of attenuating media and devices and in particular are made of couplers and absorbing amplifiers.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An all-optical system for generating high rate modulated signals, the system comprising:
   a signal generator for generating a first periodic signal having pulses at a first rate;
   an optical chopping device arranged to receive said first periodic signal and to produce therefrom, by chopping out part of the energy of said pulses of said first periodic signal, a second periodic signal including a chopped portion of the first periodic signal, wherein the second periodic signal has pulses that are narrower than the pulses of said first periodic signal, wherein said optical chopping device is selected from the group consisting of self-chopping devices, self-switching devices, self-triggering devices, self-controlled devices, self-triggered gates, and modulating devices with a self-control feature;
   a splitting device for receiving and splitting said second periodic signal into multiple images of said second periodic signal to propagate along multiple optical paths, said multiple optical paths including optical modulators for modulating said images of said second periodic signal to produce modulated signals; and
   an interleaving device for receiving and interleaving said modulated signals to produce a stream of modulated signals having a second rate that is higher than said first rate.

2. The system of claim 1 wherein said signal generator includes an optical modulator.

3. The system of claim 2 wherein said optical modulator is arranged to operate at said first rate.

4. The system of claim 1 wherein said second rate is an integer multiple of said first rate.

5. The system of claim 1 wherein said multiple optical paths include optical delay lines.

6. The system of claim 1 wherein said system includes an optical amplifier.

7. The system of claim 1 wherein said system includes a control unit to control said optical modulators.

8. The system of claim 7, wherein said system includes a tapping device for providing a tapped signal from said first periodic signal to said control unit.

9. The system of claim 1 wherein said optical modulators are arranged to operate at said first rate.

10. The system of claim 1 wherein said splitting device is a demultiplexer.

11. The system of claim 1 wherein said interleaving device is a multiplexer.

* * * * *